United States Patent [19]

Vercauteren

[11] 3,949,135
[45] Apr. 6, 1976

[54] STRUCTURED FILM

[75] Inventor: Josef Vercauteren, New Milford, N.J.

[73] Assignee: Tenneco Chemicals, Inc., Saddle Brook, N.J.

[22] Filed: June 24, 1969

[21] Appl. No.: 835,944

[52] U.S. Cl. .............. 428/215; 426/127; 428/214; 428/219; 428/339; 428/341; 428/411; 428/412; 428/421; 428/422; 428/474; 428/480; 428/500; 428/522; 428/523; 428/524; 428/532
[51] Int. Cl.² B32B 27/08; B32B 27/28; B32B 27/30
[58] Field of Search .......... 161/165, 252, 254, 256, 161/227, 189; 117/138.8 E, 76 F; 156/331; 428/214, 215, 219, 339, 341, 411, 412, 421, 422, 474, 480, 500, 522, 523, 524, 532; 426/127; 260/2 EN

[56] References Cited
UNITED STATES PATENTS

| | | |
|---|---|---|
| 2,828,237 | 3/1958 | Rosser ............................ 156/331 |
| 3,140,196 | 7/1964 | Lacy et al. ........................ 156/331 |
| 3,338,739 | 8/1967 | Rees ................... 161/252 |
| 3,355,319 | 11/1967 | Rees ................... 117/138.8 |
| 3,375,126 | 3/1968 | Nagel................... 117/76 |
| 3,402,086 | 9/1968 | Smith et al.......... 161/216 |
| 3,410,740 | 11/1968 | Smarook............ 161/189 X |
| 3,440,088 | 4/1969 | Yamada et al......... 161/189 X |
| 3,505,167 | 4/1970 | Smarook................ 161/252 |
| 3,507,685 | 4/1970 | Banerjee................. 117/76 |
| 3,513,055 | 5/1970 | Brader et al............ 117/76 |
| 3,533,878 | 10/1970 | Aulik et al................ 161/189 X |
| 3,547,689 | 12/1970 | Whitney et al. ............. 428/339 |

Primary Examiner—George F. Lesmes
Assistant Examiner—Charles E. Lipsey
Attorney, Agent, or Firm—Evelyn Berlow

[57] ABSTRACT

A structural film that can be used in the vacuum packaging of meat comprises an ionomer layer bonded to a non-ionic polymer layer with a polyalkyleneimine at the interphase of the polymer layers.

9 Claims, 2 Drawing Figures

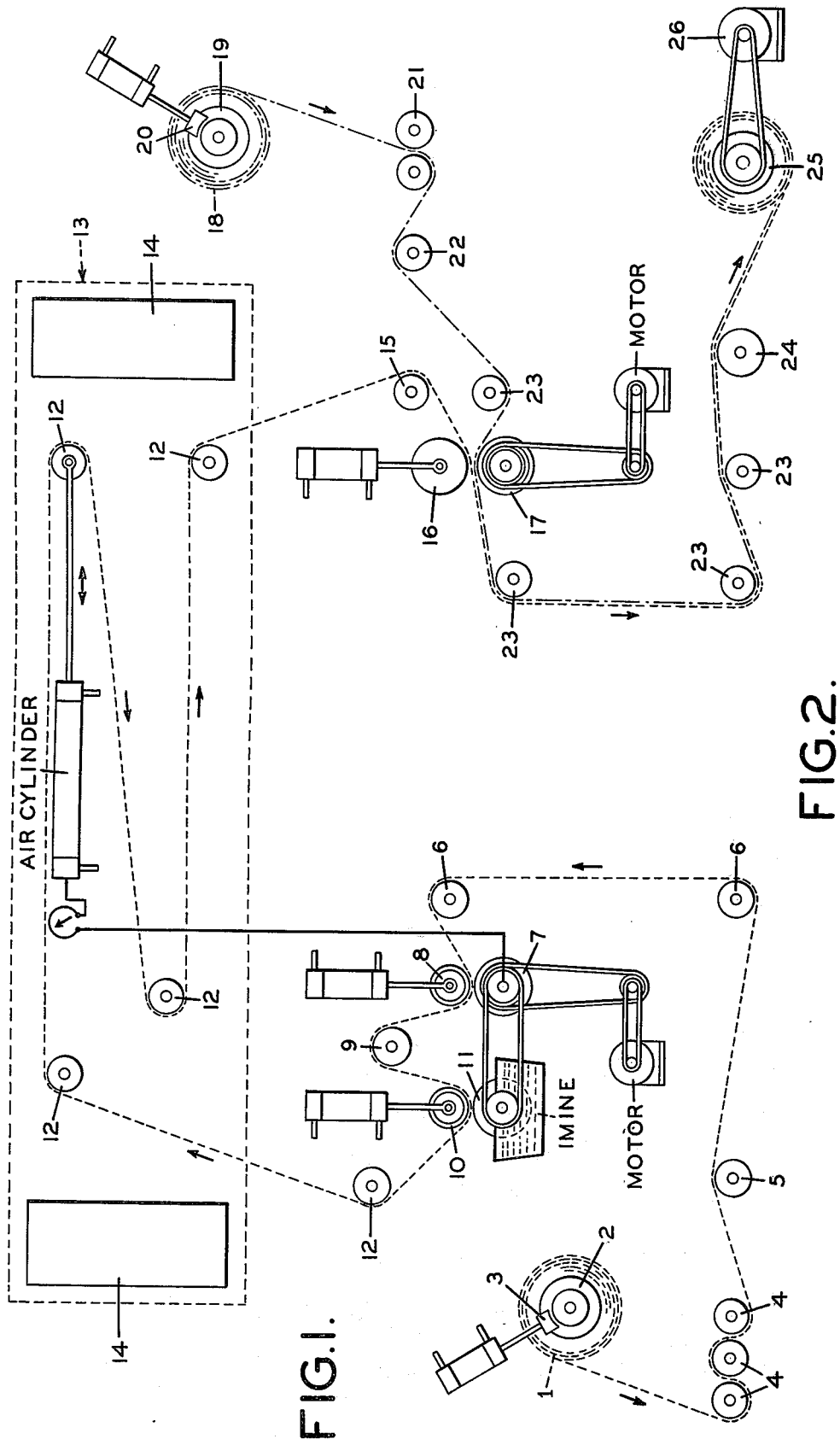
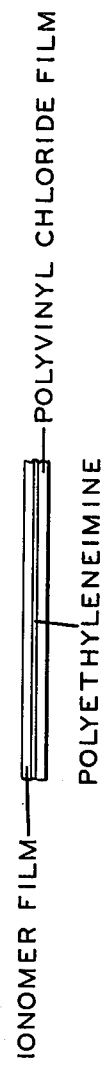
FIG.1.
FIG.2.

STRUCTURED FILM

This invention relates to structured film and to a process for its production. More particularly, it relates to structured film having two or more plies, at least one of which is an ionomer and at least one of which is a non-ionic polymer, which are bonded together with a polyalkyleneimine.

In recent years there has been an ever-growing demand for packaging materials for use in such specialized applications, as the packaging of meat, cheese, and other foods, cosmetics, and drugs. Structured and laminated films have been developed for use in those applications that require combinations of properties that are not found in a single polymer film. To be useful in the vacuum packaging of meat, for example, the packaging material must be drawable and sealable; abrasion, puncture, and tear resistant; peelable; and separation-resistant during normal handling. It should also have low permeability to oxygen, to moisture, and to grease. The meat packaging material should have excellent clarity and gloss, it should be free from residual solvent and other odors, and it should be uniform in thickness. In addition, it should be stable and have long shelf life.

Among the materials that have been proposed for use in the vacuum packaging of meats are films of ionomers and films of such non-ionic polymers as polyvinyl chloride, vinylidene chloride homopolymers and copolymers, polyesters, polyamides, polyethylene, and polystyrene. Each of these types of film meets some of the aforementioned requirements, but each has deficiencies that limits its use in this application. Films of ionomers, for example, are characterized by transparency, toughness, resilience, and low permeability to oxygen and to grease, but they do not have satisfactory stiffness, resistance to creep, and heat stability. Films of vinyl halide resin compositions, on the other hand, are rigid and have good heat stability, but they do not have the required transparency and resilience. Attempts to combine the properties of these two types of films by coating an ionomer with a vinyl halide resin have generally been unsuccessful because the coated film cannot be thermoformed without lowering its quality.

In accordance with this invention, a structured film has been developed that meets all of the aforementioned requirements for vacuum meat packaging films. As compared to the previously known polyvinyl chloride laminates and ionomer laminates, this film is superior in sealability, drawability, peelability, tear and puncture resistance, clarity, uniformity of thickness, non-permeability to oxygen, and shelf-life.

The structure films of this invention comprise an ionomer film layer, an organic non-ionic polymer film layer in bonded relationship to the ionomer layer, and a polyalkyleneimine layer at the interphase of the polymer layers.

The ionomers that are used in the preparation of the structured films of this invention are polyolefins that have pendant carboxylate groups associated with certain monovalent, divalent, and/or trivalent cations. These ionomers are copolymers of alpha-olefins having from 2 to 10 carbon atoms and alpha, beta-ethylenically unsaturated monocarboxylic acids having from 3 to 8 carbon atoms. The copolymers contain at least 50 molar percent and preferably 80 to 99 molar percent of said alpha-olefin, the remainder being one or more of said monocarboxylic acids and optionally other copolymerizable monomers, such as methyl methacrylate, styrene, or vinyl acetate. At least 10 percent of the carboxylic acid groups of the copolymer are neutralized with one or more metal ions having a valence of 1 to 3 or with an organic polyamine having 2 to 18 carbon atoms and a dissociation constant of at least $1 \times 10^{-8}$, such as ethylene diamine, hexamethylene diamine, piperazine, diethylene triamine, and the like. The copolymer may be prepared, for example, by introducing a mixture of the monomers and a free radical polymerization initiator into a polymerization environment maintained at elevated temperatures and pressures. The resulting copolymer is then neutralized with a compound having a mono-, di-, or trivalent metal ion or with an organic polyamine having a dissociation constant of at least $1 \times 10^{-8}$ to form the ionomer. The preparation of ionomers that can be used in the practice of this invention is described in detail in U.S. Pat. No. 3,264,272, which was granted to Rees on Aug. 2, 1966, which is incorporated herein by reference.

Among the alpha-olefins that can be used in the preparation of the ionomers are ethylene, propylene, butene-1, pentene-1, hexene-1, and 4-methylpentene-1. The useful alpha,beta-ethylenically-unsaturated carboxylic acids include acrylic acid, methacrylic acid, ethacrylic acid, itaconic acid, maleic acid, fumaric acid, and monoesters of said dicarboxylic acids such as methyl hydrogen maleate, ethyl hydrogen fumarate, and the like. In addition to the alpha-olefin and carboxylic acid, the copolymer may also contain other monomers, such as methyl methacrylate, ethyl acrylate, vinyl alcohol, styrene, or vinyl acetate. The preferred copolymers are ethylene/acrylic acid, ethylene/methacrylic acid, ethylene/itaconic acid, ethylene/methyl hydrogen maleate, ethylene/propylene/acrylic acid, ethylene/styrene/methacrylic acid, ethylene/vinyl acetate/acrylic acid, propylene/vinyl chloride/fumaric acid, and ethylene/vinylidene chloride/acrylic acid, each of which contains from 80 to 99 molar percent of the alpha-olefin.

Ionomers are formed when the aforementioned copolymers are treated with an amount of a metal compound or an organic polyamine that will neutralize at least 10 percent, and preferably 35 percent to 80 percent of the carboxylic acid groups of the copolymer. Particularly satisfactory results have been obtained when 50 percent to 65 percent of the carboxylic acid groups were neutralized. The metal compounds that can be used include the hydroxides, methoxides, ethoxides, formates, acetates, nitrates, carbonates, and Groups I, II, III, IV-A, and VIII of the Periodic Table of Elements. The preferred metal compounds are sodium, zinc, magnesium and aluminum methoxides, hydroxides, and acetates.

Films of a wide variety of organic non-ionic polymers may be used in the production of the structured films of this invention. These include vinyl halide homopolymers and copolymers, such as polyvinyl chloride, polyvinylidene chloride, and copolymers of vinyl chloride or vinyl fluoride with vinyl acetate, vinyl butyrate, vinylidene chloride, alkyl maleates and fumarates, acrylates, styrene, ethylene, and the like; polyvinyl acetate; polyvinyl alcohol; polyolefins, such as polyethylene and polypropylene; polyhaloethylenes, such as polytrifluorochloroethylene and polytetrafluoroethylene; polyesters, such as polyethylene glycol terephthalate; polyamides; polystyrene; cellulose esters, such as cellulose triacetate, cellulose butyrate, and cellulose nitrate; polyacrylates and polymethacrylates; polyacetals; and polycarbonates. Particularly satisfactory results have been obtained when the organic non-ionic polymer was polyvinyl chloride, polyvinylidene chloride, a vinyl chloride/vinylidene chloride copolymer, or a polyfluorohydrocarbon, such as polytrifluorochloroethylene.

The third essential component of the structured film is a polyalkyleneimine, which serves as the bonding agent between the polymer layers. The useful polyalkyleneimines have the structural formula

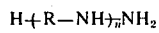

wherein R represents an alkylene group having from 2 to 4 carbon atoms and $n$ represents an integer in the range of about 500 to 2000. Illustrative of these polyalkyleneimines are polyethyleneimine, polypropyleneimine, and polybutyleneimine. Particularly satisfactory results have been obtained using a polyethyleneimine having the structural formula

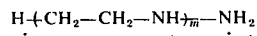

wherein $m$ represents an integer in the range of 700 to 900.

Only a very small amount of the polyalkyleneimine need be used. In general, an amount between about 5 grams and 100 grams per thousand square feet of bonded film surface is used to facilitate and promote the adhesion of the ionomer film to the non-ionic polymer film. In most cases, about 20 to 50 grams of the polyalkyleneimine per thousand square feet of bonded film surface is used. The polyalkyleneimines are applied as aqueous solutions that contain from 0.01 to 2 percent by weight, and preferably 0.025 to 0.50 percent by weight of the imine.

To be useful in the preparation of the novel structural films, both the ionomer and the non-ionic polymer that are used in the practice of this invention are precast or preformed self-supporting films that range in thickness from about 0.5 to 20 mils, and preferably from about 3 to 10 mils. Such films may be combined with a polyalkyleneimine to form threelayered structured films of ionomer, imine, and non-ionic polymer that are from about 1 to 30 mils thick and preferably about 5 to 20 mils thick.

In most cases, the structured films of this invention are three-layered structures in which an ionomer film and a non-ionic polymer film are bonded together by a thin layer of a polyalkylimine. In some cases, however, additional layers of the ionomer film and/or the non-ionic polymer film are bonded with the polyalkyleneimine to either surface of the aforementioned three-layered structure to form structured films made up of five or more layers. It is generally preferred that the multilayered structures contain one layer of the ionomer and two or more layers of the non-ionic polymer, with these layers separated by layers of the polyalkyleneimine. Illustrative of the multi-layered structures are those containing the following layers: polyvinyl chloride/imine/ionomer/imine/polyvinyl chloride; polyvinyl chloride/imine/vinyl chloride-vinylidene chloride copolymer/imine/ionomer; and polyvinyl chloride/imine/ionomer/imine/polytrifluorochloroethylene.

The structural films of this invention may be prepared by any suitable and convenient procedure. In one suitable procedure, the non-ionic polymer film is coated with an aqueous solution of a polyalkyleneimine and then heated to dry the polyalkyleneimine layer. The imine-coated surface of the film is then brought into contact with a film of the ionomer, and the resulting three-layered structure is subjected to heat and pressure to bond the films together. In another process, the ionomer film is coated with the imine, and the non-ionic polymer film is brought into contact with the imine-coated surface of the ionomer film before heat and pressure are applied to bond the films together. To insure satisfactory bonding, both the ionomer film and the non-ionic polymer film may be subjected to flametreatment, treatment with an electrical discharge, or treated with ozone or other oxidizing agents before they are brought into contact with the polyalkyleneimine solution. In general, it is preferred to use electrical discharge treatment, such as corona discharge treatment, of both films.

The invention may be more clearly understood when it is considered in conjunction with the attached drawing. In this drawing, FIG. 1 illustrates schematically a process by which the structured film may be produced.

The structure of a preferred product of this invention is shown in FIG. 2.

The processing sequence shown in FIG. 1 is as follows: substrate 1, which may be either an ionomer film or a non-ionic polymer film, is unwound from roll 2. The unwind tension is controlled by airbrake 3. The substrate proceeds through splicing nip rollers 4 and passes over a ground roller 5 which brings the film into proximity with an electrostatic surface treater or corona discharge apparatus. The substrate continues over idle rollers 6 into the nip of motor driven pull roller 7 and rubber back-up roller 8, to another idle roller 9 and through the nip of rubber back-up roller 10 and an applicator roller 11. The applicator roller 11 is submerged in an aqueous polyethyleneimine solution. The coated substrate leaves the nip of back-up roller 10 and applicator roller 11 and passes over idle rollers 12 into an oven 13 which is equipped with infra-red heaters 14. A constant tension is maintained on the substrate in the oven by a device which employs an air cylinder controlled by a pressure reducing instrument. This air cylinder is mechanically connected to a rheostat. When a variation of substrate tension occurs, the air cylinder moves laterally, simultaneously regulating the rheostat. The rheostat is electronically hooked up to pull roller 7 which was mentioned above at the point preceding entry of the substrate into the nip of applicator roller 11. The speed of back-up roller 10 and applicator roller 11 are therefore controlled by the rheostat. The temperature of the oven ranges from about 55° to 70°C., and the surface temperature of substrate in the oven is about 35° to 50°C. The substrate then leaves the oven passing over idle roller 15 into nip rollers which consist of electric heated pressure roller 16 and rubber covered motor driven back-up roller 17. The temperature of the heated pressure roller is about 80° to 200°C. At this point the two films are bonded. The second substrate 18 comes from its roll 19 controlled by air-brake 20 through splicing nip rollers 21, over a ground roller 22 which brings the film into proximity with a corona discharge apparatus under an idle roller 23 into the nip of pressure roller 16 and back-up roller 17. After bonding, the structured film proceeds over idle rollers 23 and anti-wrinkle roller 24 to a rewind roller 25 which is a rubber roller. An air motor 26 drives the rewind roller.

This process differs from the previously-used film bonding processes in that the polyalkyleneimine is applied as a dilute aqueous solution and the imine-coated substrate is dried at a temperature below 80°C. and preferably at a temperature in the range of 55° to 70°C. The use of aqueous imine solutions and low oven temperatures results in the production of superior structured films because the possibility of film deterioration resulting from the prolonged heating of the film at higher temperatures, which is necessary when organic solvents are used, is minimized and any water that remains at the interphase does not cause blistering or clouding of the structured film. In addition, the process calls for the use of a rewind roller having a surface made of a material that has approximately the same coefficient of friction as the structured film, such as natural or synthetic rubber. When such a rewind roller is used, anti-slip additive need not be incorporated into the structured film.

The invention is further illustrated by the example that follows.

EXAMPLE

A structured film was prepared by bonding an unplasticized polyvinyl chloride film that was 10 mils thick to a 10 mil film of an ethylene/methacrylic acid ionomer using a 0.25 percent aqueous solution of polyethyleneimine.

The ionomer used was an ethylene/methacrylic acid copolymer that contained 90 percent of ethylene and that had been treated with sodium methoxide to neutralize about 60 percent of its carboxylic acid groups. The 10 mil extruded film of this ionomer had the following properties as determined by standard plastics evaluation methods:

| | |
|---|---|
| Density | 0.90 g./cc. |
| Melt Flow Index | 0.7 |
| Elongation at 73°F. | 350% |
| Elmendorf Tear | 29 g./mil |
| Tensile Strength | 4600 psi |
| Stiffness (Cantilever Beam) | 68,600 psi |
| Shore Hardness | 58 |
| Area Yield | 2910 sq. in./lb./10 mils |
| Haze | 1.72% |

Using the equipment and operating conditions set forth hereinbefore, the polyvinyl chloride film was passed through the splicing nip rollers 4 and over ground roller 5 where it was exposed to a corona discharge. The treated film was then passed through the nip of applicator roller 11 and back-up roller 10 to coat it with an amount of a 0.25 percent aqueous solution of polyethyleneimine of molecular weight 35,000 that provided about 30 grams of the imine per 1,000 square feet of film service. The film was dried in an oven at 60°–65°C. The imine-coated polyvinyl chloride film was combined with the 10 mil ionomer film by passing the two films through the nip of pressure roller 16, which was maintained at 170°C., and back-up roller 17 in such a way that the polyethyleneimine coating contacted the ionomer film and became an intermediate layer between the polyvinylchloride film and the ionomer film. The structured film then proceeded to rubber rewind roller 25. The structured film produced in this way had excellent color, clarity, and gloss, high heat distortion temperature, good impact resistance, and good dimensional stability. It was impermeable to oxygen, nitrogen, carbon dioxide, and water vapor and resistant to fats, oils, greases, and alkalies. It had excellent thermoforming and hermetic sealing properties.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. A structured film that comprises (a) an ionomer film having a thickness between about 0.5 and 20 mils, said ionomer being a metal-containing ionic copolymer that is the reaction product obtained by the free radical polymerization of about 50 to 99 molar percent of an alpha-olefin having 2 to 10 carbon atoms and about 1 to 50 molar percent of at least one alpha, beta-ethylenically unsaturated carboxylic acid and the neutralization of at least 10 percent of the carboxylic acid groups of the copolymer with a metal ion having a valence of 1 to 3 or with an organic polyamine having a dissociation constant of at least $1 \times 10^{-8}$; (b) an organic non-ionic polymer film having a thickness between about 0.5 mil and 20 mils, said non-ionic polymer being a member selected from the group consisting of vinyl halide homopolymers, vinyl halide copolymers, polyvinyl alcohol, polyolefins, polyesters, polyamides, polystyrene, cellulose esters, polyacrylates, polymethacrylates, polyacetals, and polycarbonates, said non-ionic polymer film being in bonded relationship to said ionomer film; and at the interphase of the polymer films (c) a polyalkyleneimine composed of alkyleneimine units having from 2 to 4 carbon atoms in the amount of about 5 grams to 100 grams per thousand square feet of the bonded film interphase.

2. A structured film as set forth in claim 1 wherein the ionomer is the product obtained by the polymerization of 80 to 99 molar percent of ethylene and 1 to 20 molar percent of said alpha, beta-ethylenically unsaturated carboxylic acid and the neutralization of 35 to 80 percent of the carboxylic acid groups of the copolymer with an alkali metal.

3. A structured film as set forth in claim 1 wherein the ionomer is the reaction product obtained by the polymerization of 80 to 99 molar percent of ethylene and 1 to 20 molar percent of methacrylic acid and the neutralization of 50 to 65 percent of the carboxylic acid groups of the copolymer with sodium.

4. A structured film as set forth in claim 1 wherein the ionomer and the non-ionic polymer have melt indexes in the range of 0.01 to 4.0.

5. A structured film as set forth in claim 1 wherein the ionomer and the non-ionic polymer have melt indexes in the range of 0.5 to 1.5.

6. A structured film as set forth in claim 1 wherein the non-ionic polymer is polyvinyl chloride.

7. A structured film as set forth in claim 1 wherein the ionomer layer and the non-ionic polymer layer are each 3 to 10 mils thick.

8. A structured film as set forth in claim 1 wherein the polyalkyleneimine is polyethyleneimine.

9. A structured film as set forth in claim 1 wherein the non-ionic polymer is a vinyl chloride/vinylidene chloride copolymer.

* * * * *